United States Patent [19]

Berg et al.

[11] 4,312,170
[45] Jan. 26, 1982

[54] ARRANGEMENT FOR DISPENSING PROPAGATION POTS, ETC.

[75] Inventors: Ake Berg, Tjodalying; Marius Gundersen, Larvik, both of Norway

[73] Assignee: Vefi A/S, Larvik, Norway

[21] Appl. No.: 100,407

[22] Filed: Dec. 5, 1979

[30] Foreign Application Priority Data

Dec. 5, 1978 [NO] Norway .................................. 784087

[51] Int. Cl.³ .......................... B65B 5/08; B65H 3/44; B65G 59/06
[52] U.S. Cl. ....................................... 53/247; 53/246; 221/93; 221/118
[58] Field of Search ................ 53/247, 248, 244, 245, 53/246, 390; 221/118, 93, 95, 103, 292, 293, 296

[56] References Cited

U.S. PATENT DOCUMENTS

| | | | |
|---|---|---|---|
| 2,293,073 | 8/1942 | Osborne et al. | 221/118 X |
| 3,169,356 | 2/1965 | Dye | 221/93 X |
| 3,921,369 | 11/1975 | Adams | 221/93 X |
| 4,184,523 | 1/1980 | Carrigan et al. | 221/93 X |

FOREIGN PATENT DOCUMENTS 2183556 12/1973 France .
1505423 3/1978 United Kingdom .

*Primary Examiner*—Horace M. Culver
*Attorney, Agent, or Firm*—Wenderoth, Lind & Ponack

[57] ABSTRACT

An apparatus is disclosed for dispensing open-topped flanged containers such as propagation pots and the like from rows of pot stacks for individually locating the pots on a tray. The pot stacks of each row depend between parallel resiprocable support bars provided with opposite, laterally extending shoulders vertically staggered along their length, the shoulders each supporting a pot stack via the top flanges of the lowermost pot thereof. The upper ones of the shoulders have pointed wedge shaped ends that enter in between the top flanges of the two lowermost pots of the stack upon longitudinal motion of the support bars, thus separating the lowermost pot from the stack and taking over the supporting of the stack from the adjacent lower shoulder. Each lower shoulder terminates in a pointed end sloping down below the pointed wedge end of the adjacent upper shoulder to thereby enhance the separating action.

3 Claims, 8 Drawing Figures

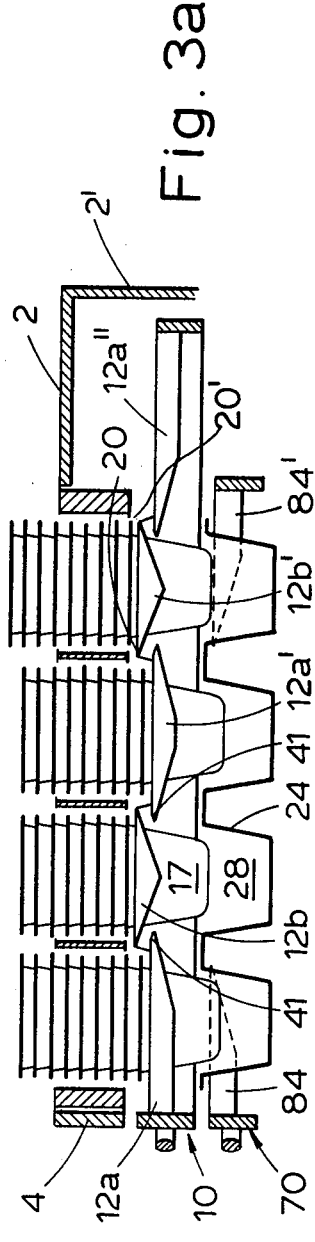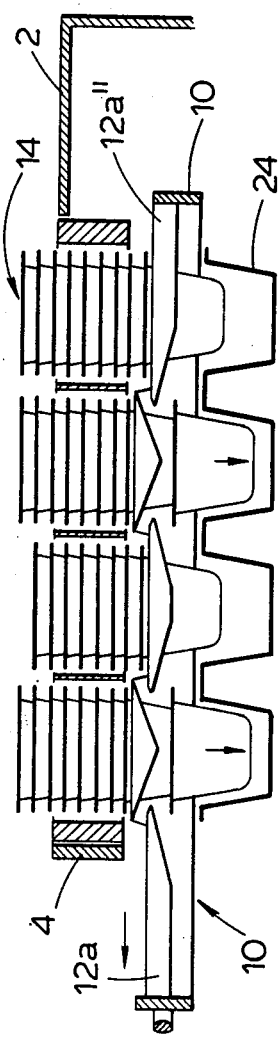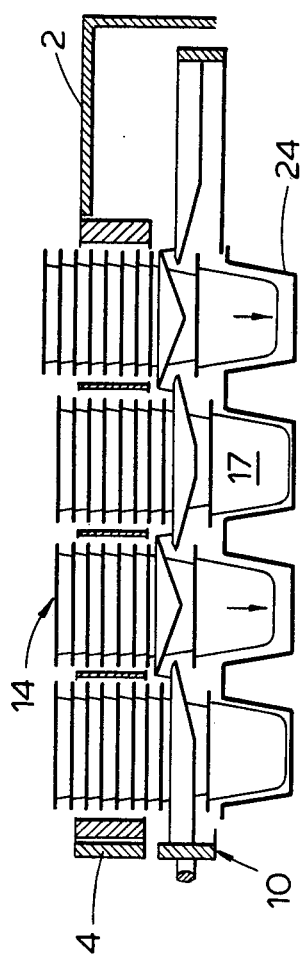

ARRANGEMENT FOR DISPENSING PROPAGATION POTS, ETC.

BACKGROUND AND SUMMARY OF THE INVENTION

The present invention relates to an apparatus for dispensing propagation pots, i.e., open-topped containers.

An apparatus of this type is shown and described in British Pat. No. 1505423.

Although this well-known apparatus works satisfactorily and is a definite technical advance in the horticultural industry, it does have some drawbacks. For example, the support strips in the reciprocable drawer are disproportionately long, because they must total the length of the support parts on which the pot stacks rest and the length of the separating ledge parts which when the drawer is pulled out separate the lowermost pots and take over the weight of the pot stacks. Thus, the support strips must be at least twice the length of one pot row of approx. 80 cm long. The strips are thus unstable in the lateral direction and have to be stiffened by means of transverse elements at the bottom of the front section of the drawer. However, this means that the support strips must be sufficiently high to carry the largest sized pots without the bottom of the pots coming into contract with the stiffening elements. Thus, when the smallest sized pots are dispensed they must drop for a short distance before they reach the recesses in the tray at the lower edge of the support strips. During their fall some pots may hit the recess lopsidedly or may be caught up thus causing delay in operation.

Another drawback with the known apparatus is the relatively long distance the drawer must travel each time it is required to separate pots. This is tiring for the operator and delays the separating operation.

The drawbacks mentioned above may partly be relieved by equipping the supporting strips in the longitudinal direction by elevationally displased pairs of support parts and separating ledge parts, which is a progress in preference to the known arrangement described in British Pat. No. 1505423 with only one row of separating ledge parts and one row of supporting parts separated from each other with an open space therebetween.

This arrangement allows the separating of pots in both directions of the reciprocable drawer, which again results in a reduction of the total length of the drawer and in the distance in which the reciprocable drawer has to be moved in and out.

French Pat. No. 2,183,556, describes a reciprocable drawer.

However, the problem regarding box-shaped pots was not solved by using the former construction of the support parts and the separating ledge parts. It should be mentioned that especially when dispensing the pots from the pot stacks the separated pots would have a tendency to lean over and to be pressed towards the walls of the other pots in the pot stacks in such way that the reciprocable drawer could not be removed.

As described on page 2, lines 121-129 in British Pat. No. 1505423, and attempt to solve the abovementioned problem was by arranging the support part and the separating ledge part spaced apart.

However, this solution was not useful for the new construction. Is was now found that by sloping down the end parts of the support parts and by allowing the support parts and the separating ledge parts to overlap each other, the problem of dispensing the pots without operation disturbances was solved in a quite satisfactorily way.

Another progress of the new construction is the continuous support strips in the longitudinal direction of the reciprocable drawer and the overlapping support parts and separating ledge parts on the same which involves a stiffening of the whole construction.

BRIEF DESCRIPTION OF THE DRAWINGS

In the following the invention will be described with reference to the accompanying drawings, wherein:

FIGS. 3a-c are side views, partially in section, of the uppermost part of the apparatus, showing one embodiment of a drawer thereof in different operating phases;

DETAILED DESCRIPTION OF THE INVENTION

Figure 1:
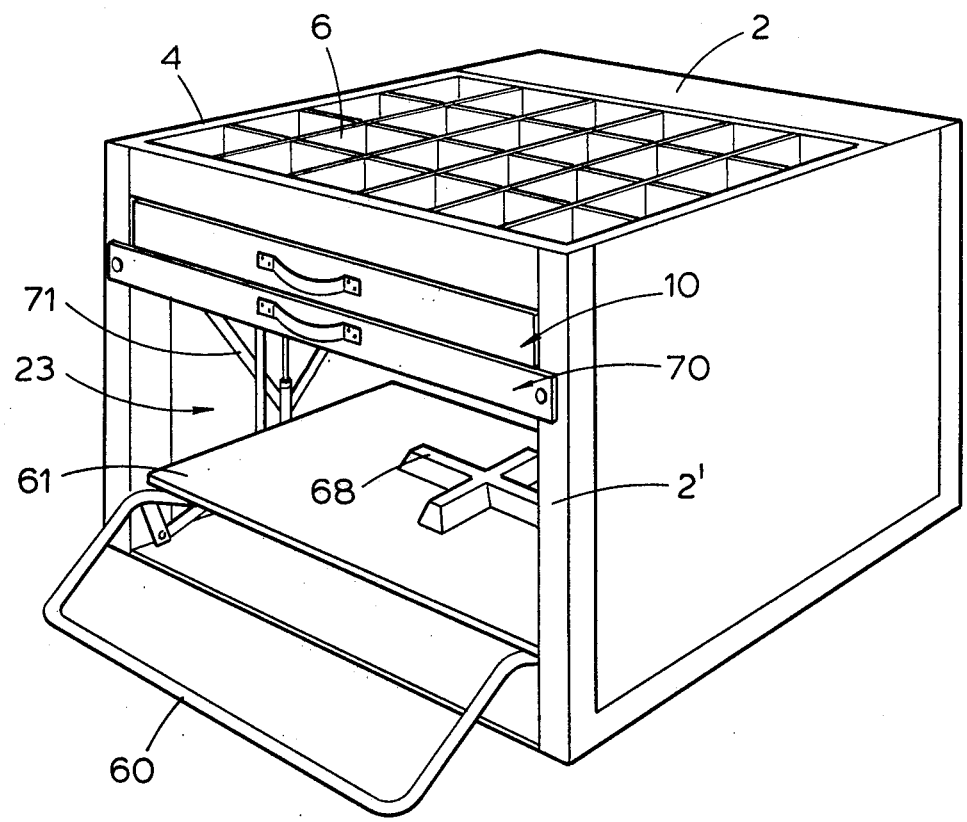
FIG. 1 is a perspective view of an apparatus in accordance with the invention.

For purposes of comparison the same numbers used in British Pat. No. 1,505,423 are used herein for elements of the apparatus which correspond or approximately correspond in the two arrangements, and in the following description more or less the same designations are used for such elements.

The apparatus as shown on the drawings consists mainly of a box-shaped housing 2 with a replaceable magazine 4 of rectangular form in the top wall for insertion of pot stacks 14 and an aperture 23 in the front wall 2' for the insertion of stacks of carrying trays 24, a reciprocable drawer 10 which supports the pot stacks 14 and also separates the lowest pot 17 in each stack of pots 14 from the remainder of the pots thereof, a lifting device 60 to lift a stack of empty carrying trays upwards to the drawer 10, and a device 70 to separate the uppermost carrying tray from the stack of carrying trays.

The apparatus consisting of the housing 2, magazine 4, drawer 10, lifting device 60 and tray separating device 70 is symmetrical to a vertical plane through the longitudinal axis and extending at a right-angled to the front wall 2'. For purposes of clarity some elements are omitted in FIG. 2. The elements of lifting device 60 are not shown on the left side of the figure, and the elements of separating device 70 are omitted on the right side of the figure.

In the following description expressions such as "in front of", "at the rear of", "in the front" and "at the rear", etc. are based on a definition that the viewer is looking from the rear wall 2" towards the front wall 2'.

The rectangular magazine 4 is divided into parallel rows of individual openings or shafts 6 for the stacked pots 14. The magazine 4 serves to hold the stacked pots in place during a reciprocal movement of the drawer 10. In the example shown in FIGS. 1-3 the magazine has four openings or shafts 6 in each row in the longitudinal direction of the housing (i.e. at right angles to the front wall 2') and six openings or shafts 6 in each row in the lateral or transverse direction (i.e. parallel with the front wall 2'). However, division of the openings or shafts will vary according to the dimensions of the pots to be dispensed, while the outer dimensions of the magazine will be more or less the same.

Figure 2:
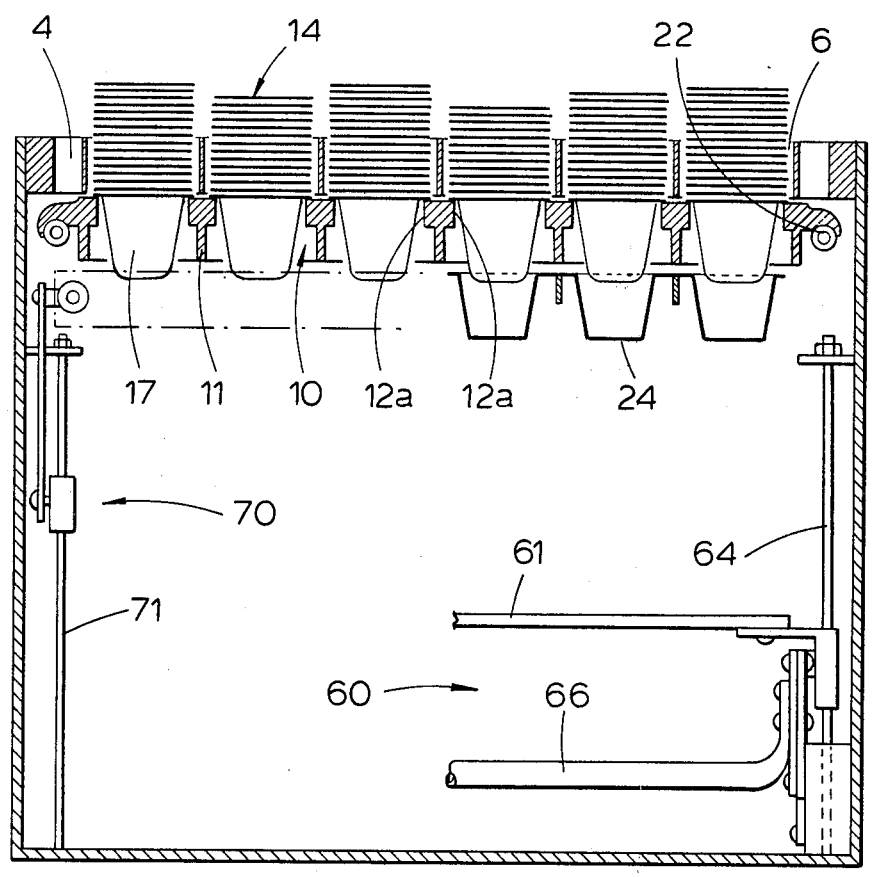
FIG. 2 is a front sectional view of the apparatus, some parts not being shown.

The drawer 10 is movably mounted on slide rails 22 mounted in the housing just below the magazine 4 as shown in FIG. 2. The drawer consists of a number of parallel support strips 11 which extend in the direction of travel of the drawer and which are mutually spaced at distances corresponding to the width of the magazine openings or shafts 6. As shown in FIG. 3a and in greater detail in FIGS. 4, 5a and 5b, the upper edge of each strip 11 includes in the longitudinal direction elevationally displaced pairs of support parts 12a, 12a', 12a" and separating ledge parts 12b, 12b', which protrude on each side of the support strip 11, the upper edge of the support parts lying at a level beneath the level of the upper edge of the separating ledge parts at a distance approximately equal to half the difference in height between the flanges 16 on two neighbouring pots in stack 14. Attention is drawn to the fact that the separating ledge parts 12b and 12b'—in addition to their separating function—also serve to support pot stacks, while the support parts 12a, 12a', etc. only serve as supports as will be described.

The two outer strips 11 in the drawer, which also form the side walls of the drawer, have support parts and separating ledge parts which only project from the inside of such outer strips.

Whereas the support strips according to British Pat. No. 1,505,423 consist of only one set of support parts 12a and one set of separating ledge parts 12b, the support strips 11 in the example shown in FIG. 3 are divided into five elevationally displaced sections of which the first 12a, the third 12a' and the fifth 12a" are support parts, and the two intervening sections 12b and 12b' are separating ledge parts. The separating ledge parts are wedge-shaped with increasing vertical dimensions in a direction rearwardly from a front point 20 and also in a direction forwardly from a rear point 20'. The separating ledge parts thereby have a double function, i.e. they separate pots from an overlying pot stack during bath inward and outward strokes of the drawer, as described below. In the example shown in FIG. 3a a pot stack 14 rests on each of the four foremost sections 12a, 12b, 12a' and 12b' in the return position of the drawer 10, i.e. four stacks 14 in each row corresponding with the openings or shafts of the magazine 4. In the case of other pot sizes the support strips 11 can be otherwise arranged in the drawer.

Figure 4:
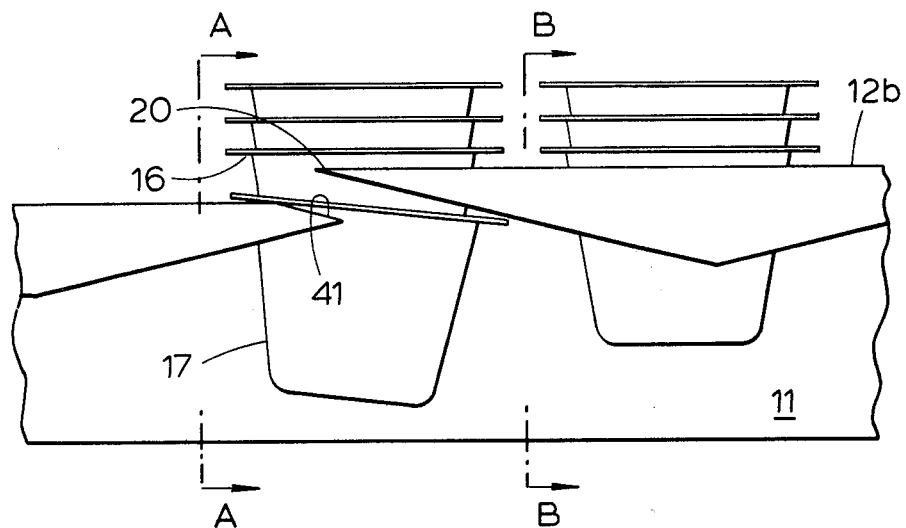
FIG. 4 is a detail view of the termination of the support part and the separating ledge part of the drawer.
Figure 5A:
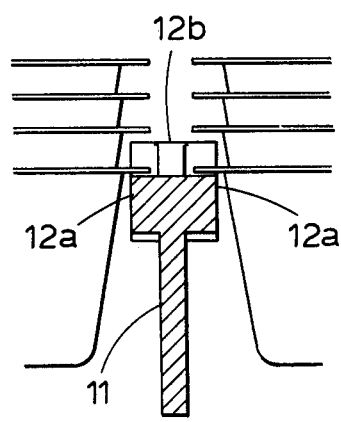
FIGS. 5a and b are sectional views along lines A and B, respectively, FIG. 4.
Figure 5B:
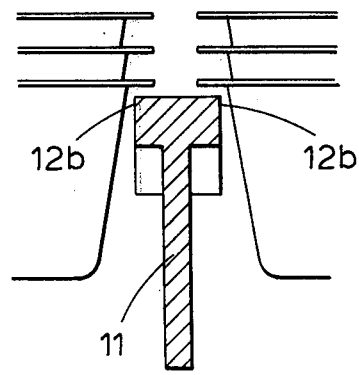

The end of each support part 12a, etc. is terminated adjacent a respective separating ledge part 12b, etc. in a point formed by a downwardly inclined edge 41 which extends in an overlapping manner below the adjacent point 20, 20' as shown in detail in FIG. 4. This configuration of the ends of the support parts provides a better guide for the pots during the separating operation, at the same time the overlap between the point of the support part and the point of the separating ledge part increasing the rigidity or stability of the support strip 11 in the lateral direction. The support strips 11 are preferably cast, e.g. of light metal.

The lifting device 60 consists mainly of a tray carrier 61 which is horizontally supported on a pantograph-hinged structure and which by aid of a manoeuvering rod 66 may be moved up and down along guide rails 64 near the side walls of the housing 10. The lifting device 60 is a conventional type and does not require further description.

The base used for separated pots is, in accordance with the arrangement described in the present invention, preferably a tray of the same type of thin plastics material as that used for the pots. Each tray 24 consists of a number of consecutive pot-shaped recesses 20 in the same rectangular pattern as the openings or shafts 6 in the magazine 4. The support for the lifting device is provided at the centre of the top side with a cross-shaped raised section 68 which fits into the spaces between the centre recesses 28 in the lowest pot tray in the stack of trays resting on the support. The raised section serves to hold the stack of trays in place on the support.

Also the tray separating device 70 is of mainly conventional type and does not itself form the invention under consideration. It consists mainly of one pair of separating ledge parts 84, 84' opposite to each other, which by aid of a sliding rod installed below the drawer 10 may be moved toward and away from each other by way of a guide mechanism 71.

Operation of the apparatus according to the invention is as follows:

With the drawer 10 in the fully closed position a suitable number of pot stacks 14 are placed in the magazine 4. Each pot stack 14 in each pot row will then rest by means of the flanges 16 of the lowermost pot thereof alternatively on a support part and a separating ledge part as shown in FIG. 3a, with the exception of the rearmost pot 12a which does not support a pot stack. Having placed a preferably corresponding number of pot trays 24 on the support 61 with the knives 84, 84' of the tray separating device 70 in the outer positions thereof the maneuvering rod 66 of the lifting device 60 is guided upwards until the topmost tray 24 lies against the lower edges of the support strips 11. The sliding rod of the separating device is then pressed in so that the separating knives enter between the flange edges of the topmost and the next topmost tray. At the same time the maneuvering rod 66 of the lifting device is returned to the starting position taking with it the support plate and the remaining trays, the separating knives now supporting the upper, separated trays in position directly under the support strips.

When the uppermost pot tray 24 is brought into position under the drawer 10, the pots as shown in FIGS. 2 and 3a have already partly entered their corresponding recesses in the pot tray, so that the possibility of displacement when separating the pots is eliminated.

The drawer 10 is then pulled out to a length corresponding to the length of a separating ledge section 12b, 12b' which in the example of FIG. 3 approximates the width of a pot. The length of pull-out of the drawer 10 can be checked by a stop on the side of the drawer which at the same time serves as a front slide shoe for supporting the drawer 10 on the sliding rails 22. As the drawer 10 is pulled out, the front point 20 on each separating ledge section 12b, 12b' will enter between the pot flanges 16 and separate the lower pot 17 in the front (first and third) pot stacks 14 which rest on support parts 12a, 12a', in principle in the same manner as explained in detail in the aforementioned British Pat. No. 1,505,423, and as indicated in the enclosed FIG. 4.

With the drawer 10 in this pulled-out position the pot stacks in each row will now be transferred to the rear support and separating ledge parts as shown in FIG. 3b. When thereafter the drawer is pushed in to its inner end position shown on FIG. 3c, the rearward directed separating points 20' of the separating ledge parts will enter between the flanges of the lowest pot in the rear stack (second and fourth in the example on FIG. 3), whereby the lower pots in these stacks will be progressively separated and pushed safely downwards along the downward upperside at the end of the support part.

The upper pot tray which is now filled with the pots which were separated by means of the reciprocating movement of the tray drawer as described above, can now be removed from the apparatus by pulling out the sliding rod of the separating device at the same time gripping the edge of the tray with the other hand. The apparatus is now ready for filling with a new pot tray in the same manner as described above.

If the above described apparatus according to the invention is compared with the apparatus in accordance with the aforementioned British Pat. No. 1505423, it will be seen that the length of stroke of the drawer 10 in the latter apparatus will always be at least equal to the length of a pot row, i.e. in practice about 40 cm, while the length of stroke of the apparatus according to the present invention is only a fraction of the length of a pot row, i.e. one-fourth of the length of a pot row with respect to the drawer of the embodiment of FIG. 3, in practice about 15 cm. Further, the total length of the drawer of the known arrangement must be at least double the length of a pot row, while the length in the case of the present invention is limited to only the length of the pot row plus the fraction mentioned. Thus, the support strips 11 can be made considerably shorter. The improved stiffness which by that means will be obtained, combined with the improved stiffness sidewardly due to the overlap between the support and the separating ledge parts, eliminates the need for separate transverse stiffening elements, and the strips can be placed so low that the bottoms of the overlying pots enter the underlying pot tray prior to separation of the underlying pots.

We claim:

1. In an apparatus for dispensing open-topped containers or pots from plural stacks of nested pots, each pot having an outwardly extending rim, the stacks being arranged in a magazine in plural longitudinal rows and plural transverse rows, and the pots being dispensed from the stacks into a tray adapted to be positioned beneath the magazine, said apparatus being of the type including a housing, the magazine adapted to be installed in an upper portion of said housing, a drawer mounted in said housing for generally horizontal reciprocal movement in opposite directions parallel to said longitudinal rows, said drawer including a plurality of parallel support strips extending in said directions, each said support strip having extending therefrom support parts for supporting rims of lowermost pots of the stacks and separating parts for supporting rims of lowermost pots of the stacks and for separating the lowermost pots of the stacks upon movement of said drawer, said support parts having upper edges at a level below the level of upper edges of said separating parts, said support parts and separating parts of each said support strip being displaced with respect to each other in said directions, the improvement wherein:
   each said separating part has a pointed end facing a longitudinally adjacent said support part; and
   each said support part has a pointed end formed by a downwardly inclined edge extending in an overlapping manner beneath said pointed end of said separating part.

2. The improvement claimed in claim 1, wherein each said support strip has alternately provided in the longitudinal direction thereof a plurality of said support parts and said separating parts.

3. The improvement claimed in claim 2, wherein each said separating part has at each opposite longitudinal end thereof a said pointed end formed by an upwardly inclined edge, such that each said separating part separates a lowermost pot from respective adjacent stacks of pots during movement of said drawer in both said opposite directions.

* * * * *